United States Patent
Morgan et al.

(10) Patent No.: US 7,502,620 B2
(45) Date of Patent: Mar. 10, 2009

(54) ENCODING AND COMPRESSION OF A LOCATION BEACON DATABASE

(75) Inventors: Edward James Morgan, Needham, MA (US); Andrew C. Payne, Lincoln, MA (US)

(73) Assignee: Shyhook Wireless, Inc., Boston, MA (US)

( * ) Notice: Subject to any disclaimer, the term of this patent is extended or adjusted under 35 U.S.C. 154(b) by 502 days.

(21) Appl. No.: 11/365,540

(22) Filed: Mar. 1, 2006

(65) Prior Publication Data

US 2006/0200843 A1    Sep. 7, 2006

Related U.S. Application Data

(63) Continuation-in-part of application No. 11/261,848, filed on Oct. 28, 2005, now Pat. No. 7,433,694.

(60) Provisional application No. 60/658,481, filed on Mar. 4, 2005.

(51) Int. Cl.
   *H04Q 7/20* (2006.01)
(52) U.S. Cl. .............. 455/456.6; 455/456.1; 370/328; 709/224; 701/214
(58) Field of Classification Search ............. 455/456.6, 455/456.5, 456.1; 370/328; 709/224; 701/214
   See application file for complete search history.

(56) References Cited

U.S. PATENT DOCUMENTS

| | | | |
|---|---|---|---|
| 5,946,615 A * | 8/1999 | Holmes et al. ............ 455/412.1 |
| 6,272,405 B1 | 8/2001 | Kubota et al. |
| 6,678,611 B2 | 1/2004 | Khavakh et al. |
| 6,888,811 B2 | 5/2005 | Eaton et al. |
| 7,123,928 B2 | 10/2006 | Moeglein et al. |
| 7,167,715 B2 | 1/2007 | Stanforth |
| 7,197,556 B1 * | 3/2007 | Short et al. ............... 709/224 |
| 7,305,245 B2 | 12/2007 | Alizadeh-Shabdiz et al. |
| 7,317,914 B2 * | 1/2008 | Adya et al. ............... 455/421 |
| 7,397,424 B2 | 7/2008 | Houri |
| 7,403,762 B2 | 7/2008 | Morgan et al. |
| 7,433,673 B1 * | 10/2008 | Everson et al. ........... 455/404.1 |

(Continued)

OTHER PUBLICATIONS

International Search Report, International Application No. PCT/US05/39208, mailed Jan. 29, 2008. (3 pages).

(Continued)

*Primary Examiner*—Danh C Le
(74) *Attorney, Agent, or Firm*—Wilmer Cutler Pickering Hale & Dorr LLP (57) ABSTRACT

A method of delta-encoding and compressing a table containing 6-byte MAC addresses is provided. The MAC addresses are sorted, a first MAC address is stored, and only the binary differences between succeeding MAC addresses are stored. A method of reading a delta-encoded and compressed MAC address table is provided. A first unencoded MAC address is read. The remaining MAC addresses are generated by successively adding stored binary differences to the result of the previous addition. A method of encoding and compressing a location table is provided. A reference latitude and longitude is selected and stored. The offsets from the reference latitude and longitude are stored for the remaining locations. A method of reading an encoded location table is provided. A stored reference latitude and longitude is read. Stored offsets are read and applied to the reference latitude and longitude to generate a set of latitude and longitude locations.

25 Claims, 3 Drawing Sheets

Delta-encoding MAC addresses

U.S. PATENT DOCUMENTS

| | | | |
|---|---|---|---|
| 2003/0225893 | A1 | 12/2003 | Roese et al. |
| 2004/0087317 | A1 | 5/2004 | Caci |
| 2004/0162896 | A1* | 8/2004 | Cen et al. .................... 709/224 |
| 2004/0205234 | A1 | 10/2004 | Barrack et al. |
| 2005/0020266 | A1 | 1/2005 | Backes et al. |
| 2005/0021781 | A1* | 1/2005 | Sunder et al. ............... 709/229 |
| 2005/0037775 | A1 | 2/2005 | Moeglein et al. |
| 2005/0043040 | A1* | 2/2005 | Contractor ............... 455/456.1 |
| 2005/0192024 | A1 | 9/2005 | Sheynblat |
| 2005/0232189 | A1* | 10/2005 | Loushine .................... 370/328 |
| 2006/0009235 | A1 | 1/2006 | Sheynblat et al. |
| 2006/0058957 | A1* | 3/2006 | Hickenlooper et al. ...... 701/213 |
| 2006/0095348 | A1 | 5/2006 | Jones et al. |
| 2006/0095349 | A1 | 5/2006 | Morgan et al. |
| 2006/0106850 | A1 | 5/2006 | Morgan et al. |
| 2006/0200843 | A1 | 9/2006 | Morgan et al. |
| 2006/0217131 | A1 | 9/2006 | Alizadeh-Shabdiz et al. |
| 2006/0240840 | A1 | 10/2006 | Morgan et al. |
| 2007/0004427 | A1 | 1/2007 | Morgan et al. |
| 2007/0004428 | A1 | 1/2007 | Morgan et al. |
| 2007/0126635 | A1 | 6/2007 | Houri |
| 2007/0202888 | A1 | 8/2007 | Brachet et al. |
| 2007/0232892 | A1 | 10/2007 | Alizadeh-Shabdiz et al. |
| 2007/0258408 | A1 | 11/2007 | Alizadeh-Shabdiz et al. |
| 2007/0258409 | A1 | 11/2007 | Alizadeh-Shabciz et al. |
| 2007/0258420 | A1 | 11/2007 | Alizadeh-Shabdiz et al. |
| 2007/0258421 | A1 | 11/2007 | Alizadeh-Shabdiz et al. |
| 2007/0259624 | A1 | 11/2007 | Alizadeh-Shabdiz et al. |
| 2008/0008117 | A1 | 1/2008 | Alizadeh-Shabdiz |
| 2008/0008118 | A1 | 1/2008 | Alizadeh-Shabdiz |
| 2008/0008119 | A1 | 1/2008 | Alizadeh-Shabdiz |
| 2008/0008120 | A1 | 1/2008 | Alizadeh-Shabdiz |
| 2008/0008121 | A1 | 1/2008 | Alizadeh-Shabdiz |
| 2008/0033646 | A1 | 2/2008 | Morgan et al. |
| 2008/0132170 | A1 | 6/2008 | Alizadeh-Shabdiz et al. |
| 2008/0139217 | A1 | 6/2008 | Alizadeh-Shabdiz et al. |
| 2008/0176583 | A1 | 7/2008 | Brachet et al. |

OTHER PUBLICATIONS

International Search Report, International Patent Application No. PCT/US06/07299, mailed Feb. 11, 2008 (2 pgs).

Written Opinion of the International Searching Authority, International Application No. PCT/US05/39208, mailed Jan. 29, 2008. (3 pages).

U.S. Appl. No. 11/261,848, filed Oct. 25, 2005, Morgan et al.

U.S. Appl. No. 11/359,154, filed Feb. 22, 2006, Morgan et al.

U.S. Appl. No. 11/359,144, filed Feb. 22, 2006, Morgan et al.

U.S. Appl. No. 11/359,271, filed Feb. 22, 2006, Morgan et al.

U.S. Appl. No. 11/430,079, filed May 8, 2006, Alizadeh-Shabdiz et al.

U.S. Appl. No. 11/430,224, filed May 8, 2006, Alizadeh-Shabciz et al.

U.S. Appl. No. 11/430,222, filed May 8, 2006, Alizadeh-Shabdiz et al.

U.S. Appl. No. 11/429,862, filed May 8, 2006, Alizadeh-Shabdiz et al.

U.S. Appl. No. 11/730,064, filed May 8, 2006, Alizadeh-Shabdiz et al.

"Delta Encoding", Wikipedia, retrieved from http://en.wikipedia.org/wiki/Delta_encoding, 2006.

Griswold et al., "ActiveCampus—Sustaining Educational Communities through Mobile Technology." UCSD CSE Technical Report #CS200-0714, 2002.

Hellebrandt, M., et al., "Estimating Position and Velocity of Mobile in a Cellular Radio Network," IEEE Transactions on Vehicular Technology, vol. 46, No. 1, Feb. 1997.

Hazas, M., et al., "Location-Aware Computing Comes of Age," IEEE, vol. 37, Feb. 2004.

"Huffman Coding", Wikipedia, retrieved from http://en.wikipedia.org/wiki/Huffman_coding, 2006.

Kawabata, K., "Estimating Velocity Using Diversity Reception," IEEE, 1994.

Kim, M., et al., "Risks of using AP locations discovered through war driving," Lecture Notes in Computer Science, vol. 3968, 2006.

Krisner, S., "One more way to find yourself," The Boston Globe, May 23, 2005, Retrieved from www.boston.com.

Krumm, J., et al., "LOCADIO: Inferring Motion and Location from Wi-Fi Signal Strengths," First Annual International Conference on Mobile and Ubiquitous Systems: Networking and Services, Aug. 2004.

Kwan, M., "Graphic Programming Using Odd or Even Points," Chinese Math. 1, 1962.

LaMarca, A., et al., "Place Lab: Device Positioning Using Radio Beacons in the Wild," Intel Corporation, 2004.

Muthukrishnan, K., et al., "Towards Smart Surroundings: Enabling Techniques and Technologies for Localization," Lecture Notes in Computer Science, vol. 3479, May 2005.

"Terminal Equipment and Protocols for Telematic Services: Information Technology-Digital Compression and Coding of Continuous-Time Still Images—Requirements and Guidelines," International Telecommunication Union, Sep. 1992.

* cited by examiner

Cluster Reference Location Information and Access Point Location Information Relationship

ENCODING AND COMPRESSION OF A LOCATION BEACON DATABASE

CROSS-REFERENCE TO RELATED APPLICATIONS

This application claims the benefit under 35 U.S.C. §119 (e) of U.S. Provisional Patent Application No. 60/658,481, filed on Mar. 4, 2005, entitled Encoding and Compressing the Access Point Database, which is herein incorporated by reference in its entirety.

This application is a continuation-in-part of and claims the benefit under 35 U.S.C. § 120 of co-pending U.S. patent application Ser. No. 11/261,848, filed on Oct. 28, 2005, entitled Location Beacon Database, which is herein incorporated by reference in its entirety.

This application is related to the following U.S. patent applications, filed on Feb. 22, 2006:

U.S. patent application Ser. No. 11/359154, entitled Continuous Data Optimization of Moved Access Points in Positioning Systems;

U.S. patent application Ser. No. 11/359271, entitled Continuous Data Optimization by Filtering and Positioning Systems; and U.S. patent application Ser. No. 11/359144, entitled Continuous Data Optimization of New Access Points in Positioning Systems.

This application is related to the following U.S. patent applications, filed on Oct. 28, 2005:

U.S. patent application Ser. No. 11/261,898, entitled Server for Updating Location Beacon Database;

U.S. patent application Ser. No. 11/261,987, entitled Method and System for Building a Location Beacon Database; and U.S. patent application Ser. No. 11/261,988, entitled Location-Based Services that Choose Location Algorithms Based on Number of Detected Access Points Within Range of User Device.

BACKGROUND

1. Field of the Invention

The invention generally relates to location-based services and, more specifically, to methods and systems of encoding and compression of a location beacon database.

2. Discussion of Related Art

Internet applications and services have historically been designed around the assumption that the user is stationary or they ignore the concept of physical location altogether. But location is an integral contextual element to how information, entertainment and communication services are delivered. In recent years the number of mobile computing devices has increased dramatically creating the need for more advanced mobile and wireless services. Mobile email, walkie-talkie services, multi-player gaming and call following are examples of how new applications are emerging on mobile devices. In addition, users are beginning to demand/seek applications that not only utilize their current location but also share that location information with others. Parents wish to keep track of their children, supervisors need to track the location of the company's delivery vehicles, and a business traveler looks to find the nearest pharmacy to pick up a prescription. All of these examples require the individual to know their own current location or that of someone else. To date, we all rely on asking for directions, calling someone to ask their whereabouts or having workers check-in from time to time with their position.

Location-based services are an emerging area of mobile applications that leverages the ability of new devices to calculate their current geographic position and report that to a user or to a service. Some examples of these services include local weather, traffic updates, driving directions, child trackers, buddy finders and urban concierge services. These new location sensitive devices rely on a variety of technologies that all use the same general concept. Using radio signals coming from known reference points, these devices can mathematically calculate the user's position relative to these reference points. Each of these approaches has its strengths and weaknesses based on the radio technology and the positioning techniques they employ.

The Global Positioning System (GPS) operated by the US Government leverages dozens of orbiting satellites as reference points. These satellites broadcast radio signals that are picked up by GPS receivers. The receivers measure the time it took for that signal to reach to the receiver. After receiving signals from three or more GPS satellites the receiver can triangulate its position on the globe. For the system to work effectively, the radio signals must reach the received with little or no interference. Weather, buildings or structures and foliage can cause interference because the receivers require a clear line-of-sight to three or more satellites. Interference can also be caused by a phenomenon known as multi-path. The radio signals from the satellites bounce off physical structures causing multiple signals from the same satellite to reach a receiver at different times. Since the receiver's calculation is based on the time the signal took to reach the receiver, multi-path signals confuse the receiver and cause substantial errors.

Cell tower triangulation is another method used by wireless and cellular carriers to determine a user or device's location. The wireless network and the handheld device communicate with each other to share signal information that the network can use to calculate the location of the device. This approach was originally seen as a superior model to GPS since these signals do not require direct line of site and can penetrate buildings better. Unfortunately these approaches have proven to be suboptimal due to the heterogeneous nature of the cellular tower hardware along with the issues of multi-path signals and the lack of uniformity in the positioning of cellular towers.

Assisted GPS is a newer model that combines both GPS and cellular tower techniques to produce a more accurate and reliable location calculation for mobile users. In this model, the wireless network attempts to help GPS improve its signal reception by transmitting information about the clock offsets of the GPS satellites and the general location of the user based on the location of the connected cell tower. These techniques can help GPS receivers deal with weaker signals that one experiences indoors and helps the receiver obtain a 'fix' on the closest satellites quicker providing a faster "first reading". These systems have been plagued by slow response times and poor accuracy—greater than 100 meters in downtown areas.

There have been some more recent alternative models developed to try and address the known issues with GPS, A-GPS and cell tower positioning. One of them, known as TV-GPS, utilizes signals from television broadcast towers. (See, e.g., Muthukrishnan, Maria Lijding, Paul Havinga, Towards Smart Surroundings: Enabling Techniques and Technologies for Localization, Lecture Notes in Computer Science, Volume 3479, January 2Hazas, M., Scott, J., Krumm, J.: Location-Aware Computing Comes of Age. IEEE Computer, 37(2):95-97, February 2004 005, Pa005, Pages 350-362.) The concept relies on the fact that most metropolitan areas have 3 or more TV broadcast towers. A proprietary hardware chip receives TV signals from these various towers and uses the known positions of these towers as reference points. The challenges facing this model are the cost of the new hardware receiver and the limitations of using such a small set of reference points. For example, if a user is outside the perimeter of towers, the system has a difficult time providing reasonable accuracy. The classic example is a user along the shoreline. Since there are no TV towers out in the ocean, there is no way to provide reference symmetry among the reference points resulting in a calculated positioning well inland of the user.

The rapid growth of 802.11 for wireless data networking has been widely documented. The majority of mobile devices, including laptop computers, now include 802.11 devices as a standard configuration. Handset manufacturers are also beginning to include 802.11 in their cellular phone devices. At the same time, consumers, businesses and public entities have deployed Wireless Local Area Networks using 802.11 in large numbers. By some estimates, over 10 million 802.11 "access points" have been deployed by the end of 2004. In metropolitan areas of the world, 802.11 radio signals propagate through almost every geographic area.

Microsoft Corporation and Intel Corporation (via a research group known as PlaceLab) have deployed a Wi-Fi Location system using the access point locations acquired from amateur scanners (known as "wardrivers") who submit their Wi-Fi scan data to public community web sites. (See, e.g., LaMarca, A., et. al., Place Lab: Device Positioning Using Radio Beacons in the Wild.) Examples include WiGLE, Wi-FiMaps.com, Netstumbler.com and NodeDB. Both Microsoft and Intel have developed their own client software that utilizes this public wardriving data as reference locations. Because individuals voluntarily supply the data the systems suffer a number of performance and reliability problems. First, the data across the databases are not contemporaneous; some of the data is new while other portions are 3-4 years old. The age of the access point location is important since over time access points can be moved or taken offline. Second, the data is acquired using a variety of hardware and software configurations. Every 802.11 radio and antenna has different signal reception characteristics affecting the representation of the strength of the signal. Each scanning software implementation scans for Wi-Fi signals in different ways during different time intervals. Third, the user-supplied data suffers from arterial bias. Because the data is self-reported by individuals who are not following designed scanning routes, the data tends to aggregate around heavy traffic areas. Arterial bias causes a resulting location pull towards main arteries regardless of where the user is currently located causing substantial accuracy errors. Fourth, these databases include the calculated position of scanned access points rather than the raw scanning data obtained by the 802.11 hardware. Each of these databases calculates the access point location differently and each with a rudimentary weighted average formula. The result is that many access points are indicated as being located far from their actual locations including some access points being incorrectly indicated as if they were located in bodies of water.

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, Lecture Notes in Computer Science, Volume 3479, January 2Hazas, M., Scott, J., Krumm, J.: Location-Aware Computing Comes of Age. IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for these indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly, outdoor radio propagation is fundamentally different than indoor radio propagation rendering these indoor positioning techniques almost useless in a wide-area scenario.

There are numerous 802.11 location scanning clients available that record the presence of 802.11 signals along with a GPS location reading. These software applications are operated manually and produce a log file of the readings. Examples of these applications are Netstumber, Kismet and Wi-FiFoFum. Some hobbyists use these applications to mark the locations of 802.11 access point signals they detect and share them with each other. The management of this data and the sharing of the information is all done manually. These applications do not perform any calculation as to the physical location of the access point, they merely mark the location from which the access point was detected.

Performance and reliability of the underlying positioning system are the key drivers to the successful deployment of any location based service. Performance refers to the accuracy levels that the system achieves for that given use case. Reliability refers to the percentage of time that the desired performance levels are achieved.

|  | Performance | Reliability |
|---|---|---|
| Local Search/Advertising | <100 meters | 85% of the time |
| E911 | <150 meters | 95% of the time |
| Turn-by-turn driving directions | 10-20 meters | 95% of the time |
| Gaming | <50 meters | 90% of the time |
| Friend finders | <500 meters | 80% of the time |
| Fleet management | <10 meters | 95% of the time |
| Indoor asset tracking | <3 meters | 95% of the time |

SUMMARY

The invention provides a method for encoding and compression of a location beacon database.

Under one aspect of the invention, a location-based services system has a reference database of Wi-Fi access points in a target area. Each access point in the target area is identified by a corresponding fixed size MAC address, and each Wi-Fi access point is positioned at a corresponding geographical location. The MAC addresses and geographical locations of the access points are encoded to facilitate storage and/or transmission of the database contents to Wi-Fi enabled devices using the system. The encoding comprises the acts of: (a) storing as an entry of the database a reset address entry, said reset address entry including a fixed-size MAC address and marker information to indicate that the entry has a complete MAC address for a corresponding access point; (b) for each access point in at least a subset of access points in the target area, encoding a mathematical difference between (i) the MAC address of a corresponding access point and (ii) one of the other MAC addresses represented in the database, and storing said encoding, as delta information, in a corresponding delta address entry of the database, said delta address entry further including marker information to indicate that the entry has delta information from which a complete MAC address for a corresponding access point can be reconstituted; and (c) for each entry in the database, including information to represent the geographical location of the corresponding access point.

Under another aspect of the invention, multiple reset address entries are stored. Each reset address defining a boundary of a set of MAC addresses that are delta encoded.

Under another aspect of the invention, the delta information is encoded into a selected one of multiple delta address formats. Each delta format has a corresponding storage size different than the storage sizes of the other delta formats and different than the fixed size. Each delta format has an unique marker information to distinguish itself from the other delta formats.

Under another aspect of the invention, the information to represent geographical location includes cluster identification information to identify a cluster having a known corresponding longitude and latitude, and further includes a longitude offset value and latitude offset value. The longitude offset value encodes the distance from the access point longitude to the known longitude of the identified cluster. The latitude offset value represents the distance from the access point latitude to the identified cluster latitude.

Under another aspect of the invention, a location-based services system has a reference database of Wi-Fi access points in a target area. Each access point in the target area is identified by a corresponding fixed size MAC address, and each Wi-Fi access point is positioned at a corresponding geographical location. The MAC addresses and geographical locations of the access points are encoded to facilitate storage and/or transmission of the database contents to Wi-Fi enabled devices using the system. The encoding comprises the acts of: (a) storing cluster identification information to identify a cluster having a known corresponding longitude and latitude; (b) for each access point in at least a subset of access points in the target area, storing a longitude offset value and latitude offset value, the longitude offset value encoding the distance from the access point longitude to the known longitude of the identified cluster, and a latitude offset value to represent the distance from the access point latitude to the identified cluster latitude; and (c) for each entry in the database, including information to represent the MAC address of the corresponding access point.

Under another aspect of the invention, a Wi-Fi enabled device has first logic to determine the MAC addresses of Wi-Fi access points in the vicinity of the Wi-Fi enabled device by exchanging Wi-Fi messages with Wi-Fi access points in the vicinity of the Wi-Fi enabled device. The device has second logic to query a reference database of Wi-Fi access points. Using the MAC addresses determined by the first logic, the second logic retrieves from the database information representing at least the physical location for each MAC address-identified Wi-Fi access point in the database. The device has third logic, using the queried physical location information from the second logic, to calculate the position of the Wi-Fi enabled device. The reference database includes a reset entry having a complete MAC address for at least one Wi-Fi access point and includes a plurality of delta entries. Each delta entry has a mathematical encoding representing a difference between the MAC address of a corresponding Wi-Fi access point and another MAC address represented in the database. Each entry in the database further includes information representing the physical location of a corresponding Wi-Fi access point.

DETAILED DESCRIPTION

Embodiments of the present invention provide methods for encoding and compression of a location beacon database, such as a 802.11 Wi-Fi access point database, for use in a Wi-Fi Positioning System. The access point database may contain millions of access points with corresponding locations of the points. This presents a challenge for any device centric model where the database is wirelessly downloaded and kept locally on the mobile device. However, it is desirable to have an access point database on the mobile device. By leveraging the device centric model, users do not require a continuous network connection. Removing the network requirement allows the database to be usable in more application scenarios. Under certain embodiments, a data encoding and compression technique significantly reduces the data storage requirements for the access point database, making it easier to distribute the database or segments of the database to Wi-Fi enabled devices.

An uncompressed MAC address occupies 6 bytes. As explained in further detail below, access point locations having a resolution of 1 meter occupy 7 bytes. Thus, a single uncompressed data record having an access point MAC address and an associated location can occupy 13 bytes. The techniques of certain embodiments of the invention take advantage of delta encoding and data clustering to reduce a single access point record down to 7-8 bytes. This enables the database to occupy a smaller amount of memory on the mobile device and reduces the amount of bandwidth and time required to transfer the database or a portion thereof.

Embodiments of the present invention build on techniques, systems and methods disclosed in earlier filed applications, including but not limited to U.S. patent application Ser. No. 11/261,988, filed on Oct. 28, 2005, entitled Location-Based Services that Choose Location Algorithms Based on Number of Detected Access Points Within Range of User Device, the contents of which are hereby incorporated by reference in its entirety. Those applications taught specific ways to gather high quality location data for Wi-Fi access points so that such data may be used in location based services to determine the geographic position of a Wi-Fi-enabled device utilizing such services. In the present case, new techniques are disclosed for compressing and encoding the access point database. The present techniques, however, are not limited to systems and methods disclosed in the incorporated patent applications. Instead those applications disclose but one framework or context in which the present techniques may be implemented. Thus, while reference to such systems and applications may be helpful, it is not believed necessary to understand the present embodiments or inventions.

Figure 1:
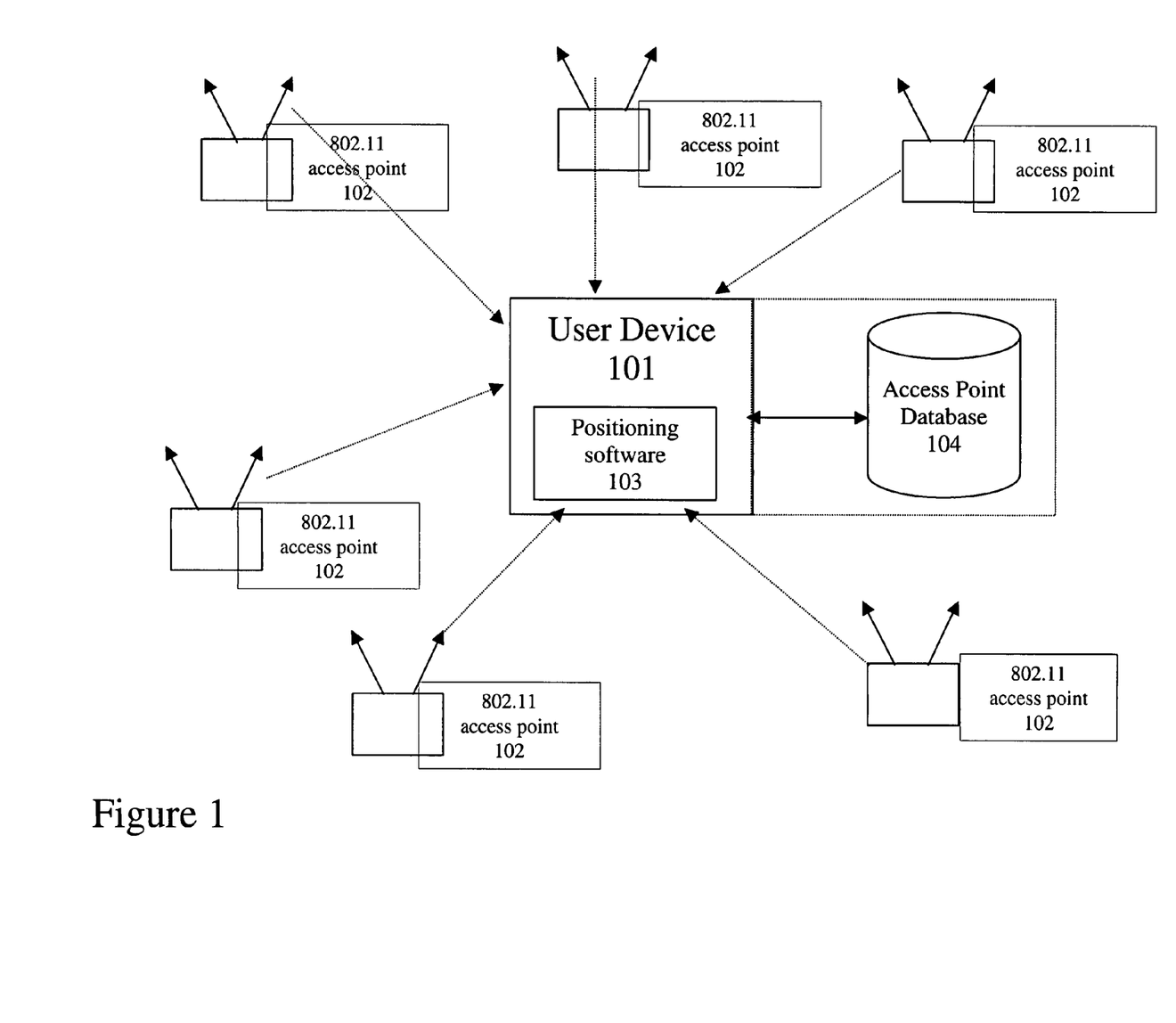
FIG. 1 depicts certain embodiments of a Wi-Fi positioning system.

FIG. 1 depicts a portion of an embodiment of a Wi-Fi positioning system (WPS). The positioning system includes positioning software [103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its access point database [104], which may or may not reside on the device as well. If the access point database is located on the device, it may be in an encoded and compressed format. In such an embodiment, a decoding and decompression method may be used to read the access point database, as described in detail below. The access point database contains the calculated geographic locations or power profile of all the access points the gathering system has collected. The power profile is a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

Encoding and Compression Scheme for the Access Point Database

Under aspects of certain embodiments, a data encoding and compression technique significantly reduces the data storage requirements for the access point database, making it easier to efficiently distribute the database or segments of the database to mobile users and to store the database or database segments on a mobile device. As mentioned above and described in greater detail below, the technique takes advantage of delta encoding and data clustering to reduce a single access point record down to 7-8 bytes. This enables the database to occupy a smaller amount of memory on the mobile device and reduces the amount of bandwidth and time required to transfer the database or a portion thereof.

The database is used to look up access point data by MAC address. One data item is the access point's location (latitude and longitude), but other data items may be included. Under the general approach of the technique, a device looks up a MAC address in a compressed table. If the MAC address is present, the device returns access point data associated with the MAC address entry. This data may be, for example, the location of the access point assigned the MAC address, or this data may be a table index of the MAC address entry. In embodiments using a table index, the table index is used to retrieve the associated data (such as location) from another table. The implementation may cache the associated data results of some number of recently looked up MAC addresses, and return those immediately without having to re-access the database. The data encoding and compression approaches are summarized in the following sections.

Embodiments of the present invention may be implemented, for example, in software logic running on a computer or computing device platform. Likewise, embodiments may be implemented in hardware-encoded logic.

MAC Data Encoding and Compression

Access points are uniquely identified by a 48-bit MAC address (e.g. 00:0C:41:F3:CA:65). These addresses are assigned to each device at the time of manufacture, and are guaranteed unique. With a binary, uncompressed encoding, the MAC address can be stored in 6 bytes.

Under an embodiment of the invention, the MAC address table is significantly compressed with delta-encoding of MAC addresses. This is accomplished by sorting the MAC table, and storing only the differences between successive entries. If the differences (deltas) are small, they can be stored using less than 6 bytes. The scheme is summarized in FIG. 2.

Figure 2:
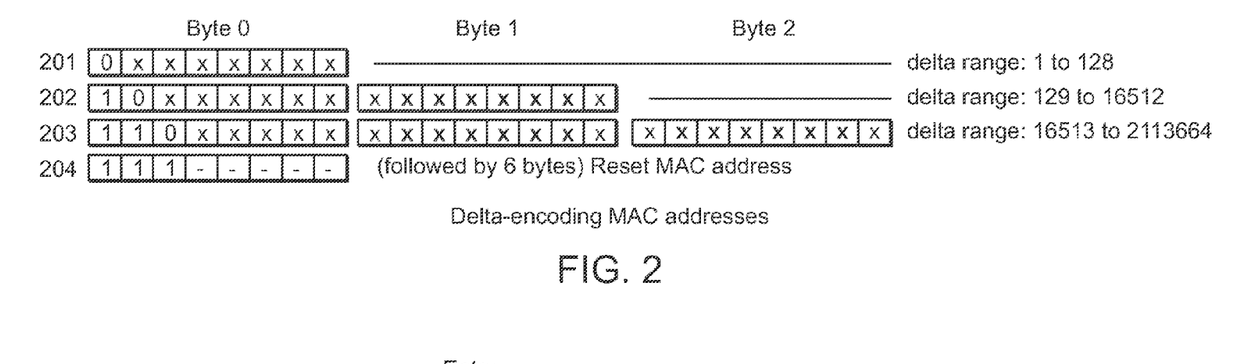
FIG. 2 depicts a scheme for delta-encoding MAC addresses according to certain embodiments of the invention.

In the scheme depicted in FIG. 2, the deltas are encoded into one, two or three bytes. Under certain embodiments, the most-significant (left-most) bits of the first byte indicate the length of the delta code. Using a Huffman-like coding method, a most-significant bit of 0 would indicate a delta coding length of one byte, with the remaining 7 bits used to encode the delta value of 1 to 128. If the most significant bits of the first byte are (1,0), the delta is encoded in 14 bits representing a value of 129 to 16512, using the remaining 6 bits in the first byte and 8 in the second byte. If the most significant bits of the first byte are (1,1,0), the delta value is encoded in 21 bits over three bytes for a delta range of 16513 to 2113664. If the delta will not fit in a three-byte value (i.e., the difference from the respective MAC address and immediately prior MAC address in the database is greater than 2113664), the delta is not encoded and the complete MAC address is coded (this is the fourth case [204] on the diagram) indicated by a most-significant bit pattern of (1,1,1). Such a MAC address is referred to as a "reset MAC address". Thus, the bit patterns act as markers to indicate whether a complete MAC address or delta follows. Note that the delta of zero never has to be coded, since MAC addresses will not occur more than once in the table. With a 54 k entry test database, this approach compressed the MAC table to approximately 98 k bytes, or about 1.8 bytes per MAC address.

In the embodiments described above, the addition of new access points to the MAC address table requires resorting and recalculation of the deltas. In addition, this may result in generation of new and/or different reset MAC addresses.

The delta-encoding technique described above may also be accomplished relative to a reset MAC address rather than the preceding MAC address or MAC address delta. In such an embodiment, all MAC addresses following a reset MAC address are delta encoded by storing the difference between the MAC address being encoded and the nearest preceding reset MAC address. Thus, successive delta entries are not dependent on one another. In these embodiments, addition of new delta encoded access point MAC addresses does not require resorting and recalculation of all other delta entries in the delta table.

Under certain embodiments, MAC lookups are processed by scanning the table from the beginning. The scanning technique keeps a current MAC value, and iterates through the table decoding the deltas and adding them to the running MAC value. When a match is reached, the scanning stops and a table index (i.e., what location the MAC address occurred in the table) or the desired data is returned. Note that the scanning terminates with "not found" when a table MAC address is reached that is higher than the search MAC address (since the table is ordered).

Figure 3:
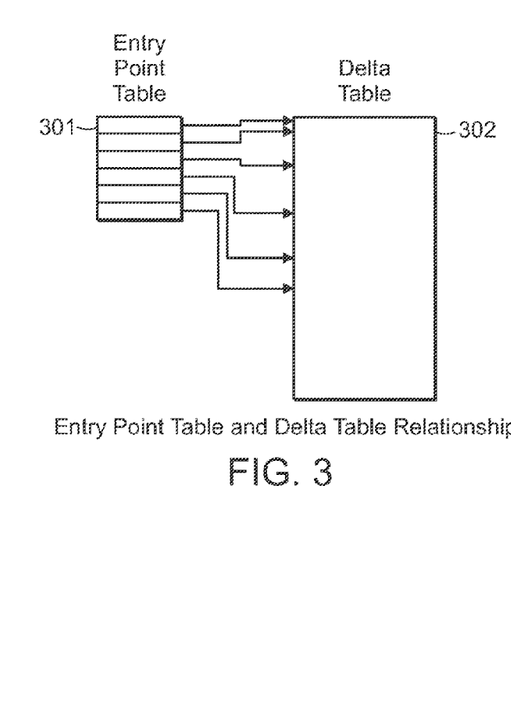
FIG. 3 depicts a relationship between an entry point table and a MAC address delta table according to certain embodiments of the invention.

While the above lookup technique is simple, a sequential scan of a large table (millions of MAC addresses) can take significant time. One optional optimization is to keep a side "entry point" table that contains the indexes of entries in the delta table where the full MAC address is coded (i.e., the reset MAC address). FIG. 3 graphically depicts the relationship between the entry point table and the delta table.

With this optimization, the lookup routine in certain embodiments can use the entry point table [301] to binary search the MAC addresses in the delta table [302]. When a delta table region is identified (i.e., the search MAC is located between two entry points), the region can be sequentially scanned. This approach speeds up the look up by a factor of N on average, where N is the number of reset MAC addresses in the entry point table. In the 54 k entry test MAC database, there were approximately 1,900 reset MAC address entry points.

Note that there is a pathological case where the MAC table is efficiently delta encoded and has few or no reset MAC address entries, or has large ranges that have no reset MAC address entries. These cases may be dealt with during table compression, by forcing the creation of a reset MAC address entry (even if not needed) if a large number of addresses have been compressed before a naturally occurring reset MAC address is encountered.

Latitude/Longitude Database Encoding and Compression

In some embodiments, an access point's location is represented by a latitude, longitude, and altitude (distance above sea level). At least one embodiment omits altitude by assuming the location is at or near ground level. The longitude defines an east/west location, and covers 360 degrees (−180 to 179). The latitude defines the north/south location, and covers 180 degrees (−90 to 89).

The representation of latitude and longitude depend on the required resolution. The circumference of the earth is approximately 40,000 km. The number of discrete longitude positions for a given resolution may be calculated by dividing 40,000 km by the resolution desired. The number of bits (based on a power of 2) required to represent the longitude may then be determined from the number of discrete longitudes. The table below shows the relationship between the desired resolution, number of discrete longitudes, and bits required to represent the longitude.

| Resolution | Discrete Longitudes | Bits to Represent |
| --- | --- | --- |
| 1 m | 40,000,000 | 26 |
| 3 m | 13,333,333 | 24 |
| 10 m | 4,000,000 | 22 |
| 30 m | 1,333,333 | 21 |
| 100 m | 400,000 | 19 |

Note that the representation of latitude (north/south) requires one less bit to represent, since the latitude only spans half of the earth circumference. Given this, the combined latitude and longitude resolution may be coded as found in the table below.

| Resolution | Bits (lat + Lon) | Bytes |
| --- | --- | --- |
| 1 m | 51 | 7 |
| 3 m | 47 | 6 |
| 10 m | 43 | 6 |
| 30 m | 41 | 6 |
| 100 m | 37 | 5 |

The location data is more difficult to compress, since it is not regularized or correlated. In order to further the compression ratio, at least one embodiment takes advantage of the clustering that happens around countries and population centers.

The generalized approach defines a cluster scheme, where each location is stored as a cluster ID, latitude offset, and longitude offset, rather than an absolute latitude and longitude value. The offsets define the location of the MAC addresses relative to a cluster reference location, for example, the center of the cluster. The offsets may be defined as distances from the location of a given access point to the reference location. A separate cluster table defines the cluster reference locations latitude and longitude values of each cluster. This cluster table may be downloaded to the mobile device for use in later decoding the location information.

Figure 4:
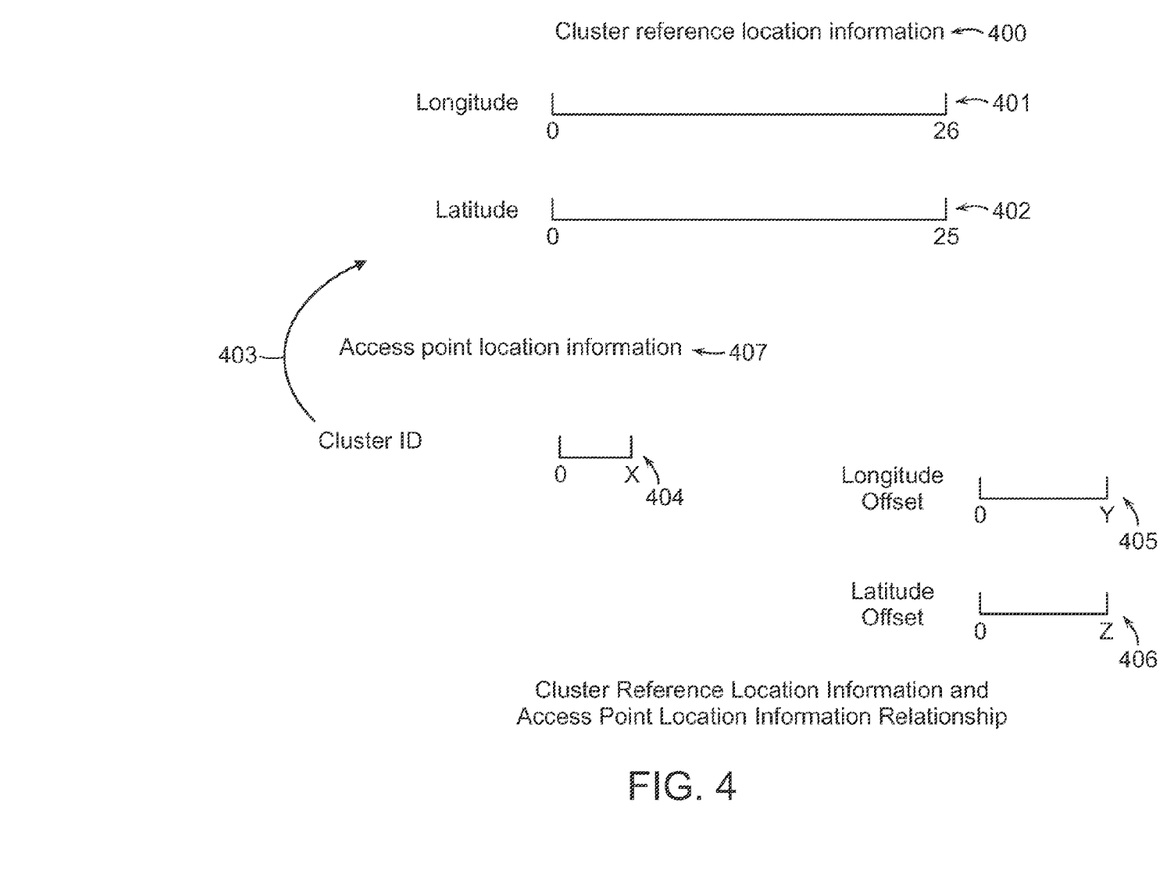
FIG. 4 depicts a relationship between a cluster reference location information record and an access point location record according to certain embodiments of the invention.

FIG. 4 shows the relationship between the cluster reference location information [400] and the access point location information [407] for at least one embodiment. For example, the cluster reference location information [400] comprises a longitude [401] occupying 26 bits, at a 1 m resolution, and a latitude [402] occupying 25 bits, also at a 1 m resolution. A cluster ID [404], occupying a variable number of bits (shown as X), is associated with the longitude [401] and latitude [402] as shown by arrow [403].

The cluster ID [404] is also associated with the access point location information [407] for access points within the cluster. The access point information [407] also comprises a longitude offset [405], occupying a variable number of bits (shown as Y), and a latitude offset [406], occupying a variable number of bits (shown as Z). The clustering technique described above allows the cluster ID [404], longitude offset [405], and latitude offset [406] information to be stored in less than the total number of bits that would be required to store the access point location as an absolute longitude and latitude.

Thus, in order to retrieve the access point's location, the access point location information [407] is read. The cluster ID [404] is then used to retrieve the cluster reference location information [400] via the relationship [403]. The longitude offset [405] is applied to the longitude [401] to produce the longitude of the access point location. Similarly, the latitude offset [406] is applied to the latitude [402] to produce the latitude of the access point location.

For example, the continental US can be enclosed in a box about 5000 km by 3000 km. This can be encoded to 3 m resolution with 21 bits for the longitude, and 20 bits for the latitude, for a total of 41 bits—close to fitting in 5 bytes (vs. 6). One way to take advantage of this is to have two MAC/location databases: one for the US (using 5 bytes for the location), and one for the rest of the world. This technique could be used for other major population areas (e.g. Europe, Australia, etc.)

Certain embodiments may designate the clusters before the access point data are gathered. For example, the technique may select a particular geographic region as a cluster, for example a country, state, or city. Thus, all access points found within the geographic region would be assigned to the predetermined cluster. In this embodiment, the technique then generates a cluster reference location, for example by calculating the center location of the cluster or the center location of all access points found within the geographic region.

Other embodiments may determine the clusters based on the data obtained. Under these embodiments, the technique reduces the size required to store the data by looking for "clumps" of access points near each other. Each clump may then be designated as a cluster, and a cluster reference location may be calculated as above. The ideal size and number of clusters may be determined by varying the size, number, and cluster reference locations of the clusters and comparing the data storage requirements for each combination.

The compression routines described above may occur in a regional data pack builder of a Wi-Fi location system and may be initiated on a periodic basis to build out data files for the entire database or sub-regions. The routines may be run in batch mode, and each region may be defined by entering boundary coordinates for each region. In certain embodiments, the compression routines will create a data file for each designated region. The resulting files may then be transferred to a data update portion of the location system's server so that remote clients (such as mobile devices) can connect to the server and download the latest compressed files for their region.

The client applications (such as mobile devices) may be configured to check the server on a periodic basis for new data files for their region. If the client locates a new data file, it downloads the new data file and replaces the older one.

Thus, under an embodiment of the invention, in order to return the location of a detected access point, the client application would first locate the block to search for the MAC address in the delta table given the entry point table. This returns the start offset and start index of the delta block in the delta table. The application then walks down the delta table (starting at the offset previously retrieved) until it finds the MAC address. Once found, a table index is retuned for the MAC address corresponding to the access point's entry in the coordinates table. The client application then extracts the latitude and longitude delta from the coordinates table. Finally, the client application calculates the latitude and longitude by applying the delta to the cluster reference location.

EXAMPLE OF INTENDED USE

A traveling salesman wants to find the nearest ATM machine so that he can pick up some money before heading to the airport. He pulls out of his pocket his Wi-Fi enabled Smartphone and runs his favorite mapping application. He selects "find nearest ATM" in the application. The mapping application makes a position request to the Wi-Fi Positioning System (WPS) component resident on the device. The WPS software begins scanning for nearby 802.11 access points and builds a list of them as the signals return.

The WPS then tries to compare those access point MAC addresses against those in the local database. The WPS uses the compression and encoding scheme to search the compressed data file resident on the device. For each observed access point it checks the data file for a location. Once it has the location for the observed access points found in the compressed data file, the WPS calculates the Smartphone's location and returns that latitude and longitude data back to the mapping application. The mapping application calculates the distance from the salesman's current location to the nearest ATM machine and provides simple directions for how to get there.

It will be appreciated that the scope of the present invention is not limited to the above described embodiments, but rather is defined by the appended claims, and these claims will encompass modifications of and improvements to what has been described. For example, although the reset MAC addresses may be created dynamically as described above, the reset MAC addresses may also be chosen before encoding the delta table.

What is claimed is:

1. In a location-based services system having a reference database of Wi-Fi access points in a target area, each access point in the target area identified by a corresponding fixed size MAC address and each Wi-Fi access point positioned at a corresponding geographical location, a method of encoding MAC addresses and geographical locations of the access points to facilitate storage or transmission of the database contents to Wi-Fi enabled devices using the system, the method comprising the acts of:
   (a) storing as an entry of the database a reset address entry, said reset address entry including a fixed-size MAC address and marker information to indicate that the entry has a complete MAC address for a corresponding access point;
   (b) for each access point in at least a subset of access points in the target area, encoding a mathematical difference between (i) the MAC address of a corresponding access point and (ii) one of the other MAC addresses represented in the database, and storing said encoding, as delta information, in a corresponding delta address entry of the database, said delta address entry further including marker information to indicate that the entry has delta information from which a complete MAC address for a corresponding access point can be reconstituted; and
   (c) for each entry in the database, including information to represent the geographical location of the corresponding access point.

2. The method of claim 1, further including storing multiple reset address entries, each reset address defining a boundary of a set of MAC addresses that are delta encoded.

3. The method of claim 1, wherein act (b) encodes the difference between a corresponding MAC address and the MAC address of one of the reset addresses.

4. The method of claim 1, wherein act (b) encodes the difference between a corresponding MAC address and a reconstituted MAC address, said reconstituted MAC address being represented in the database as delta information.

5. The method of claim 1, wherein delta information is encoded into a selected one of multiple delta address formats, each delta format having a corresponding storage size different than the storage sizes of the other delta formats and different than the fixed size, and wherein each delta format has an unique marker information to distinguish itself from the other delta formats.

6. The method of claim 5, wherein each delta format corresponds to a unique range of difference values.

7. The method of claim 6, wherein the unique range of difference values is 1 to 128, the storage size is 1 byte, and the delta format begins with a 0 in a left-most bit position of the 1 byte.

8. The method of claim 6, wherein the unique range of difference values is 129 to 16512, the storage size is 2 bytes, and the delta format begins with a 1 followed by a 0 in two left-most bit positions.

9. The method of claim 6, wherein the unique range of difference values is 16513 to 2113664, the storage size is 3 bytes, and the delta format begins with a 1 followed by a 1, followed by a 0 in three left-most bit positions.

10. The method of claim 6, wherein the MAC address of a corresponding access point is coded as a reset address if the mathematical difference is greater than 2113664.

11. The method of claim 1, wherein the information to represent geographical location includes cluster identification information to identify a cluster having a known corresponding longitude and latitude, and further includes a longitude offset value and latitude offset value, the longitude offset value encoding the distance from the access point longitude to the known longitude of the identified cluster, and a latitude offset value to represent the distance from the access point latitude to the identified cluster latitude.

12. In a location-based services system having a reference database of Wi-Fi access points in a target area, each access point in the target area identified by a corresponding fixed size MAC address and each Wi-Fi access point positioned at a corresponding geographical location, a method of encoding MAC addresses and geographical locations of the access points to facilitate storage or transmission of the database contents to Wi-Fi enabled devices using the system, the method comprising the acts of:
(a) storing cluster identification information to identify a cluster having a known corresponding longitude and latitude;
(b) for each access point in at least a subset of access points in the target area, storing a longitude offset value and latitude offset value, the longitude offset value encoding the distance from the access point longitude to the known longitude of the identified cluster, and a latitude offset value to represent the distance from the access point latitude to the identified cluster latitude; and
(c) for each entry in the database, including information to represent the MAC address of the corresponding access point.

13. The method of claim 12, further including storing multiple cluster identification information records, each record defining the known corresponding longitude and latitude for use in act (b) with a subset of access points.

14. The method of claim 13, wherein access points are placed into subsets on the basis of the access points' geographic location.

15. A Wi-Fi enabled device comprising:
(a) first logic to determine the MAC addresses of Wi-Fi access points in the vicinity of the Wi-Fi enabled device, by exchanging Wi-Fi messages with Wi-Fi access points in the vicinity of the Wi-Fi enabled device;
(b) second logic to query a reference database of Wi-Fi access points, using the MAC addresses determined by the first logic, said second logic retrieving from the database information representing at least the physical location for each MAC address-identified Wi-Fi access point in the database; and
(c) third logic, using the queried physical location information from the second logic, to calculate the position of the Wi-Fi enabled device;
(d) wherein said reference database includes a reset entry having a complete MAC address for at least one Wi-Fi access point and includes a plurality of delta entries, each delta entry having a mathematical encoding representing a difference between the MAC address of a corresponding Wi-Fi access point and another MAC address represented in the database, each entry in the database further including information representing the physical location of a corresponding Wi-Fi access point.

16. The Wi-Fi enabled device of claim 15, wherein the reference database is for a target geographical area and is stored on the Wi-Fi enabled device.

17. The Wi-Fi enabled device of claim 15, the reference database further including multiple reset entries, each reset entry defining a boundary of a set of MAC addresses that are delta encoded.

18. The Wi-Fi enabled device of claim 15, wherein the other MAC address represented in the database is one of the reset addresses.

19. The Wi-Fi enabled device of claim 15, wherein the other MAC address represented in the database is a reconstituted MAC address, said reconstituted MAC address being represented in the database as delta information.

20. The Wi-Fi enabled device of claim 15, wherein the delta entries are encoded into a selected one of multiple delta address formats, each delta format having a corresponding storage size different than the storage sizes of the other delta formats and different than the fixed size, and wherein each delta format has a unique marker information to distinguish itself from the other delta formats.

21. The Wi-Fi enabled device of claim 20, wherein each delta format corresponds to a unique range of difference values.

22. The Wi-Fi enabled device of claim 21, wherein the unique range of difference values is 1 to 128, the storage size is 1 byte, and the delta format begins with a 0 in a left-most bit position of the 1 byte.

23. The Wi-Fi enabled device of claim 21, wherein the unique range of difference values is 129 to 16512, the storage size is 2 bytes, and the delta format begins with a 1 followed by a 0 in two left-most bit positions.

24. The Wi-Fi enabled device of claim 21, wherein the unique range of difference values is 16513 to 2113664, the storage size is 3 bytes, and the delta format begins with a 1 followed by a 1, followed by a 0 in three left-most bit positions.

25. The Wi-Fi enabled device of claim 21, wherein the MAC address of a corresponding access point is coded as a reset address if the mathematical difference is greater than 2113664.

* * * * *